US00RE43087E

(19) United States
(12) Reissued Patent
Tsai et al.

(10) Patent Number: US RE43,087 E
(45) Date of Reissued Patent: Jan. 10, 2012

(54) IMAGE SCANNER USING LOW-PIXEL-DENSITY CCD TO ACHIEVE HIGH-PIXEL-DENSITY SCANNING QUALITY BY PIXEL-LEVEL SHIFT OF CCD

(75) Inventors: Jenn-Tsair Tsai, Hsinchu (TW); Jone-Nun Chen, Hsinchu (TW); I-Chang Lu, Hsinchu (TW)

(73) Assignee: Transpacific Optics LLC, Wilmington, DE (US)

(21) Appl. No.: 11/384,187

(22) Filed: Mar. 16, 2006

Related U.S. Patent Documents

Reissue of:
(64) Patent No.: 6,707,583
Issued: Mar. 16, 2004
Appl. No.: 09/644,423
Filed: Aug. 23, 2000

(51) Int. Cl.
*H04N 1/04* (2006.01)

(52) U.S. Cl. ..... 358/497; 358/494; 358/474; 358/486; 358/483

(58) Field of Classification Search ..... 358/497, 358/494, 471, 474, 450, 486, 487, 488, 483, 358/482, 505, 506, 512–514; 399/211, 212; 348/294; 382/318, 319, 312, 298, 299; 250/208.1, 250/234–236
See application file for complete search history.

(56) References Cited

U.S. PATENT DOCUMENTS 6,147,780 A * 11/2000 Chiang ..... 358/497
6,185,012 B1 * 2/2001 Yun ..... 358/494

FOREIGN PATENT DOCUMENTS

TW 313286 7/1996
TW 313286 7/2006

* cited by examiner

*Primary Examiner* — Cheukfan Lee
(74) *Attorney, Agent, or Firm* — Perkins Coie LLP

(57) ABSTRACT

An image scanner performing multiple scanning operations for a single scan line is disclosed. The additional scanning operations are performed between two adjacent pixels. For a double scanning mode, the CCD performs one scanning operation for a scan line at a first position. Then, the CCD is moved from the first position to a second position along the X-direction to perform the other scanning operation at the second position. The distance between the first and the second positions is a half of the distance between two adjacent pixels. The scanning data of the two scanning operations are alternatively arranged and converted into final image data. By this way, a low-pixel-density CCD can be used to obtain a high-pixel-density scanning quality.

26 Claims, 8 Drawing Sheets

IMAGE SCANNER USING LOW-PIXEL-DENSITY CCD TO ACHIEVE HIGH-PIXEL-DENSITY SCANNING QUALITY BY PIXEL-LEVEL SHIFT OF CCD

Matter enclosed in heavy brackets [ ] appears in the original patent but forms no part of this reissue specification; matter printed in italics indicates the additions made by reissue.

FIELD OF THE INVENTION

The present invention relates to an image scanner which includes a charge coupled device (CCD) of a low pixel density, and particularly to an image scanner using the low-pixel-density CCD to achieve a better scanning quality than it could. The better scanning quality can be obtained by performing a small-amount shift of the CCD.

BACKGROUND OF THE INVENTION

Due to the improvement on manufacturing techniques and the reduction of cost, an image scanner becomes a popular peripheral equipment for a personal computer. Meanwhile, owing to the enhancement of the processing speed of the computer itself and the increasing requirement of users on the scanning quality, the resolution of an image scanner is getting higher and higher. Therefore, it is a trend for the manufacturers of image scanners to improve the resolution as possible as they can.

The resolution of an image scanner is generally expressed by X DPI×Y DPI wherein DPI means Dot Per Inch. the number Y indicates the count of scanning lines per inch, which is determined by the moving speed of a carriage driven by a stepping motor along the Y-axis. The number X represents the optical resolution which is determined by the amplifying rate of the lens device and the pixel number of the photoelectric converting device such as a charge coupled device (CCD). For X=600 as an example, it means that each inch of the scanned image in the X-direction, through the focusing and contraction of the lens device, is exposed by 600 pixels of the CCD.

In order to enhance the optical resolution of the image scanner, a software interpolation method or a CCD of a high pixel number can be optionally used. If a software interpolation method is used to simulate a high-level state, no additional cost for hardware equipment is needed but there is more or less distortion for the obtained image. If a CCD of a high pixel number is used, the cost of the resulting image scanner will multiply increase. Therefore, various researches are performed in order to develop an image scanner of higher resolution, better scanning quality, and lower cost.

The Taiwanese Patent Publication No. 313286 filed Jul. 29, 1996, and incorporated herein for reference, discloses a twice-scanning process by using a low-pixel-number CCD to scan a half of a document, and then moved along the X-direction to scan the other half of the document so as to double the resolution compared to the only once scanning operation by a CCD of the same pixel number. This process, however, still has disadvantages. First of all, the long distance movement of the light-program device including the CCD and the lens device across a half of the document along the X-direction has adversely effect on positioning precision. In addition, the switching device for driving the light-program device to move that long requires a complicated and bulky structure, and thus consumes a lot of power. Further, it takes time to move such a long distance.

SUMMARY OF THE INVENTION

Therefore, an object of the present invention is to provide an image scanner using a low-pixel-density CCD, which is moved in a pixel level, to achieve a high-pixel-density scanning quality in an efficient way.

A first aspect of the present invention relates to an image scanner for reading and converting an image of an object into digital image data. The image scanner includes a photoelectric sensing device including a plurality of sensing pixels arranged at equal spaces for converting an optical signal from the object into an electric signal, and a shifting device connected to the photoelectric sensing device for driving the photoelectric sensing device from a first position to a second position along an X-direction to obtain a first electric signal and a second electric signal, respectively, wherein a distance between the first and the second positions is less than a distance between two adjacent sensing pixels, and the first and the second electric signals are alternately arranged and converted to form the digital image data.

In an embodiment, the photoelectric sensing device includes a lens device for focusing and contracting the optical signal, a linear charge coupled device consisting of the plurality of sensing pixels which senses the focused and contracted optical signal to generate the electric signal, and a holder for mounting thereon the lens device and the linear charge coupled device. The holder is driven by the shifting device to allow the lens device and the linear charge coupled device to be moved together from the first position to the second position.

Generally, the image scanner further includes a mirror set arranged upstream of the lens device for transmitting the optical signal from the object to the lens device, and a carriage housing mounted therein the mirror set, the photoelectric sensing device and the shifting device, and moved along a Y-direction to scan the object.

In an embodiment, the shifting device includes a guiding track secured on the carriage housing for guiding the holder along the X-direction, a first magnetic element secured on the holder, and a second magnetic element secured on the carriage housing and cooperating with the first magnetic element to generate a magnetic force. The magnetic force includes alternate attracting and repelling forces between the first and the second magnetic elements so as to reciprocate the holder between the first and the second positions along the guiding track.

Preferably, the shifting device further includes two stoppers located by two opposite sides of the holder in order to further assure that the holder reciprocates between the first and the second positions.

Preferably, the first magnetic element is a first permanent magnet, and the second magnetic element includes an electric motor and a second permanent magnet. The second permanent magnet is coupled to and driven by the electric motor to rotate relative to the first permanent magnet to switch the magnetic force between the attracting and repelling forces so as to reciprocate the holder.

Preferably, the distance between the first and the second positions is equal to a half of the distance between two adjacent sensing pixels.

A second aspect of the present invention relates to an image scanner which includes a photoelectric sensing device including a plurality of sensing pixels arranged at equal spaces for converting an optical signal from the object into an electric signal, a carriage housing for mounting therein the photoelectric sensing device, and a shifting device connected to the carriage housing for driving the carriage housing to move the photoelectric sensing device from a first position to a second position along an X-direction. The photoelectric sensing device is actuated at the first and the second positions to obtain a first electric signal and a second electric signal, respectively. A distance between the first and the second positions is less than a distance between two adjacent sensing pixels. The first and the second electric signals are alternately arranged and converted to form the digital image data.

In an embodiment, the photoelectric sensing device includes a lens device for focusing and contracting the optical signal, a mirror set arranged upstream of the lens device for transmitting the optical signal from the object to the lens device, and a linear charge coupled device consisting of the plurality of sensing pixels which senses the focused and contracted optical signal to generate the electric signal.

Broadly, the term "image scanner" used herein includes any suitable digital image pickup device which scanning an object and converting the image of the object into digital image data. Further, the image scanner can be a reflective or a transmissive or a dual-mode image scanner.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
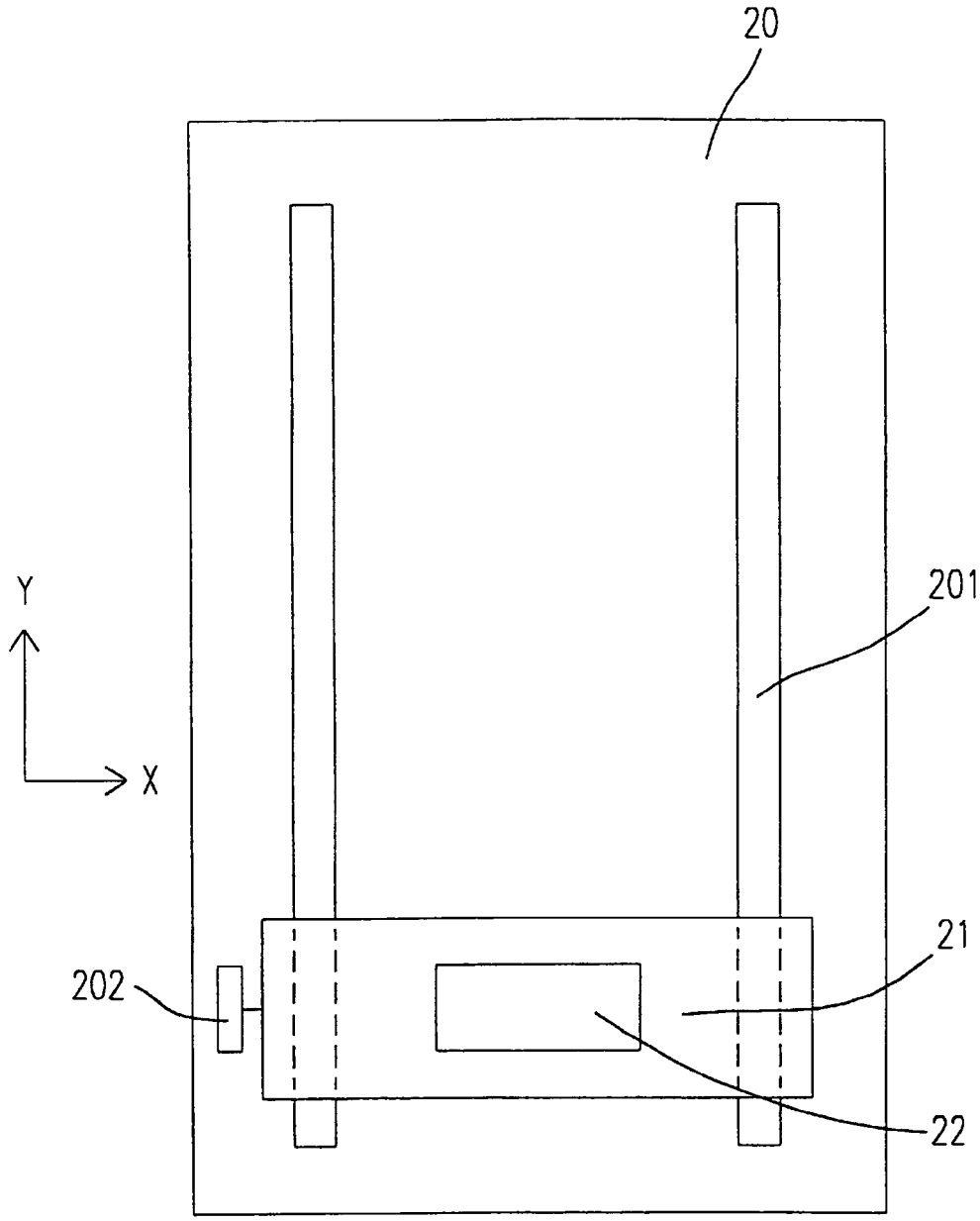
FIG. 1 is a schematic diagram partially showing a preferred embodiment of an image scanner according to the present invention.

Please refer to FIG. 1 which is a schematic diagram partially showing a preferred embodiment of an image scanner according to the present invention. The image scanner 20 includes a carriage 21 for accommodating therein an optical device 22 for picking up the image of a scanned object (not shown). The carriage 21 is moved by a stepping motor 202 along a pair of guiding shafts 201 in a Y-direction. For each step, the optical device 22 is actuated to pick up a scan line of the image of an object in an X-direction. With the movement of the carriage 21 along the Y-direction, the entire object is scanned line by line.

Figure 2:
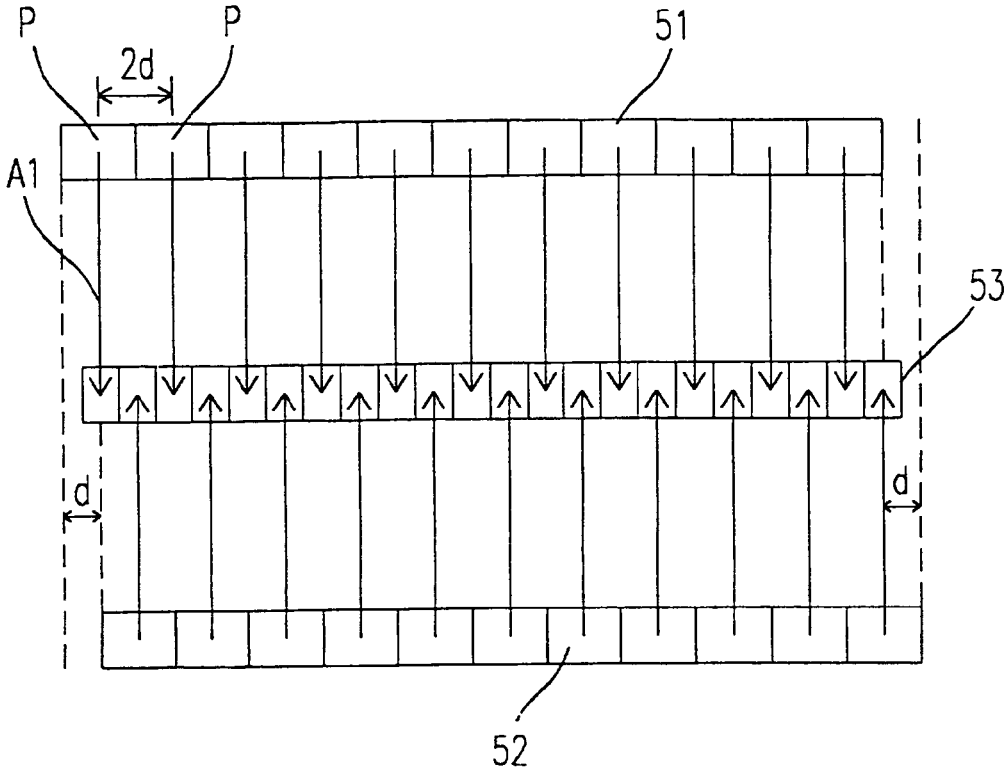
FIG. 2 illustratively shows a double scanning mode of the image scanner according to the present invention.

The operational principle of the image scanner of FIG. 1 is illustrated as follows with reference to FIG. 2. For easy understanding, a double scanning mode is given as an example. The term "double scanning" indicates that each scan line of the object is scanned twice, and the twice scanning results are synthesized to obtain the scanned image data.

Differing from the above-mentioned conventional double scanning method which scans the document by way of a left half scanning and a right half scanning, the present double scanning method scans a document in an interpolation manner. Please refer to FIG. 2. The optical device includes a linear charge coupled device (CCD) which includes a plurality of sensing pixels P equally spaced by a distance 2d, and is originally located at a first position 51. The sensing pixels P of the CCD pick up a scan line of image to obtain a first series of electric signals, and the output is indicated by downward arrows A1. Afterwards, the CCD is shifted by a distance d along the X-direction to a second position 52 to pick up the same scan line of image to obtain a second series of electric signals, and the output is indicated by upward arrows A2. For synthesis, the outputs A1 and A2 are alternately arranged as indicated by the numeral reference 53, and then converted into image data. As shown, the pixel density of the obtained image data according to the present invention is increased, thereby enhancing the resolution of the image scanner.

Although a double scanning mode is given as an example, it is apparent for those skilled in the art to apply the above principle to a multiple scanning mode by dividing the distance between two adjacent sensing pixels into equally spaced sections.

Figure 3:
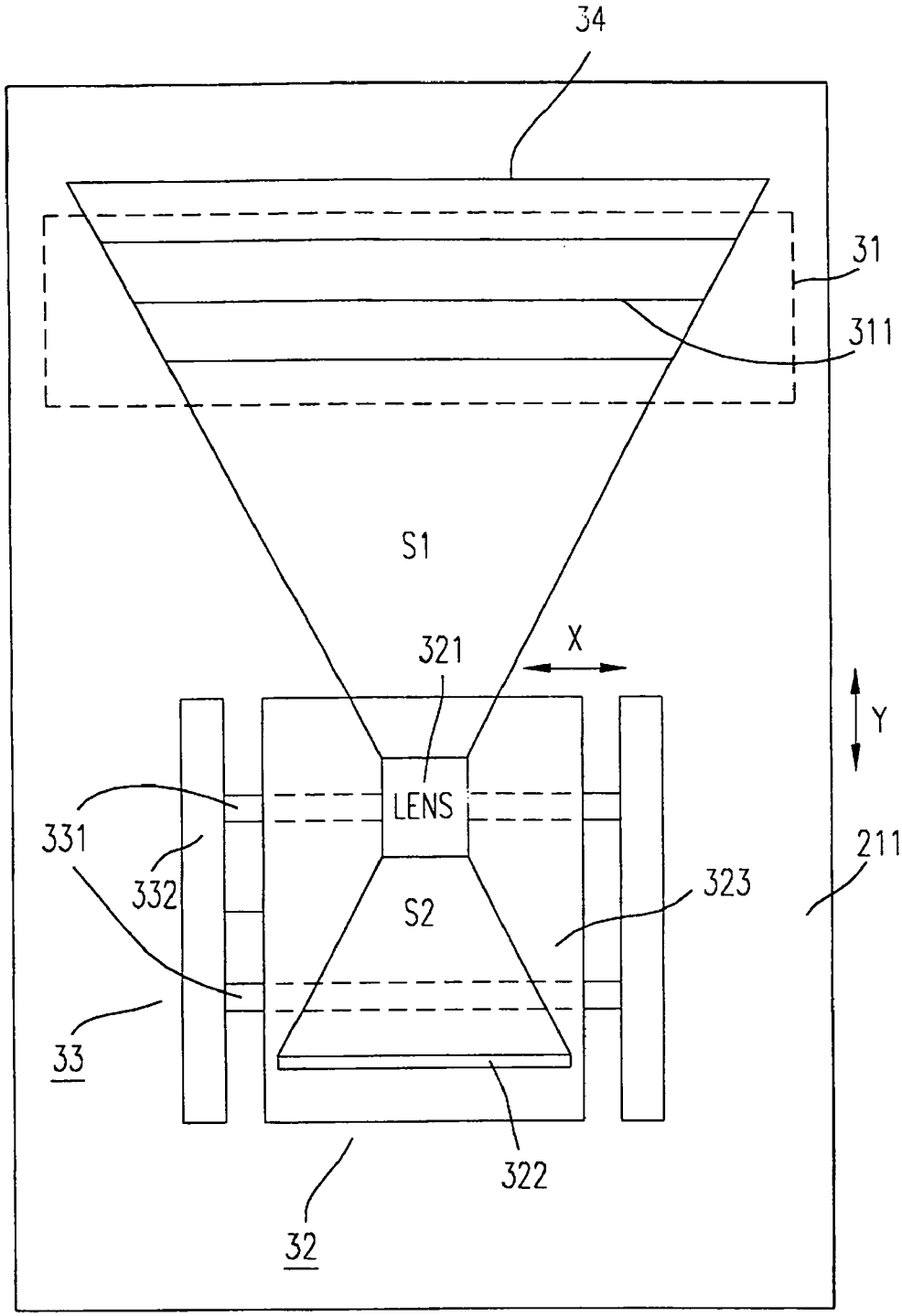
FIG. 3 schematically shows the elements included in the carriage of FIG. 1.

Please refer to FIG. 3 which schematically shows the elements included in the carriage of FIG. 1. The carriage includes a carriage housing 211 accommodated therein a mirror set 31, a photoelectric sensing device 32 and a shifting device 33. The photoelectric sensing device 32 includes a lens device 321, a CCD 322 and a holder 323. The lens device 321 and the CCD 322 are secured on the holder 323 so that the lens device 321 and the CCD 322 will move together when the holder 323 is moved by the shifting device 33. The mirror set 31 is used for transmitting an optical signal S1 from a scanned object 34 to the lens device 321. The lens device 321 focuses and contracts the optical signal S1, and allows the focused and contracted optical signal S2 to be exposed on corresponding sensing pixels of the CCD 322. The mirror set 31 includes one or more mirrors 311 depending on the desired light-transmission route between the scanned object 34 and the lens device 321. The shifting device 33 includes a guiding track 331 allowing the holder 323 to move therealong. The shifting device 33 further includes. driving means 332 for moving the holder 323 along the guiding track 331 according to a predetermined program.

In order to perform a double scanning mode as mentioned above, four embodiments of the driving means 332 are described with reference to FIGS. 4A~4D. It should be understood that the embodiments are given only for illustration, and do not intend to limit the present invention.

Figure 4A:
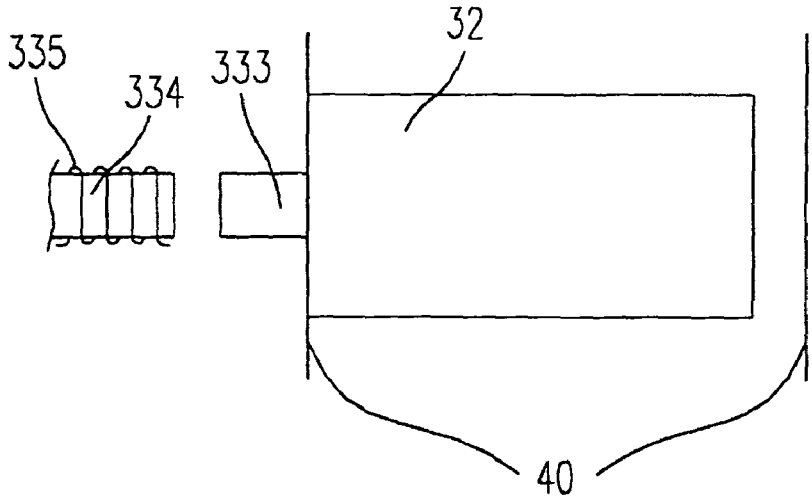
FIGS. 4A~4D schematically show four embodiments of the shifting device of FIG. 3, respectively, wherein a double scanning mode is performed for each embodiment.

Please refer to FIG. 4A. The driving means 332 includes a permanent magnet 333 and an electromagnet 334. The permanent magnet 333 is secured on one side of the holder 32, and the electromagnet 334 is secured on the carriage housing 211 (FIG. 3), and aligned with the permanent magnet 333. A coil 335 is mounted around the electromagnet 334, and passes therethrough a current. By changing the direction of the current, e.g. clockwise or counterclockwise, the polarizing direction varies accordingly. One polarizing direction makes the magnetic force between the two magnets 333 and 334 become an attracting force, and the other polarizing direction makes the magnetic force become a repelling force. The switching between the attracting and the repelling forces reciprocates the holder 32 along the guiding track 331 (FIG. 3). In order to make sure of the precise movement of the holder 32 between the first position and the second position (FIG. 2), two stoppers 40 are arranged by the opposite sides of the holder 32.

Figure 4B:
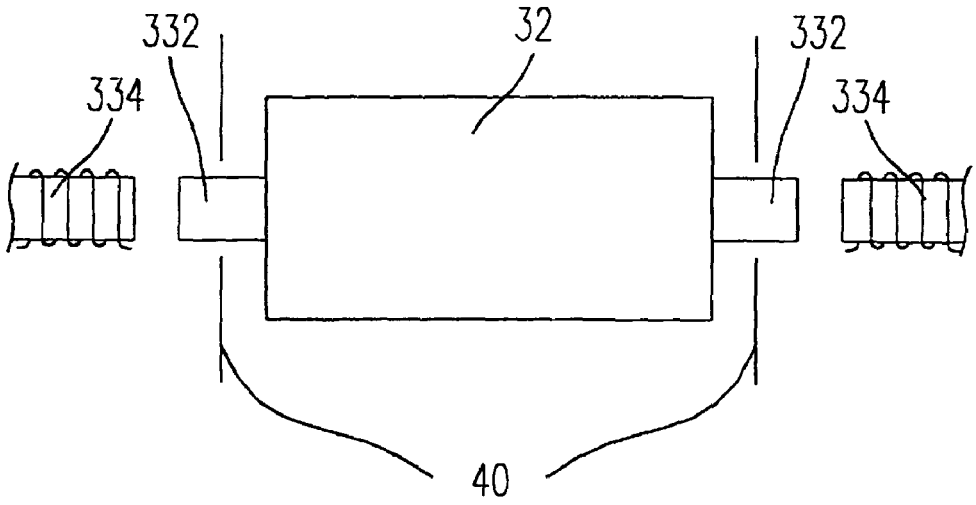

Please refer to FIG. 4B. The driving means 332 is similar to the one shown in FIG. 4A except that an additional pair of magnets are provided to increase the magnet force.

Figure 4C:
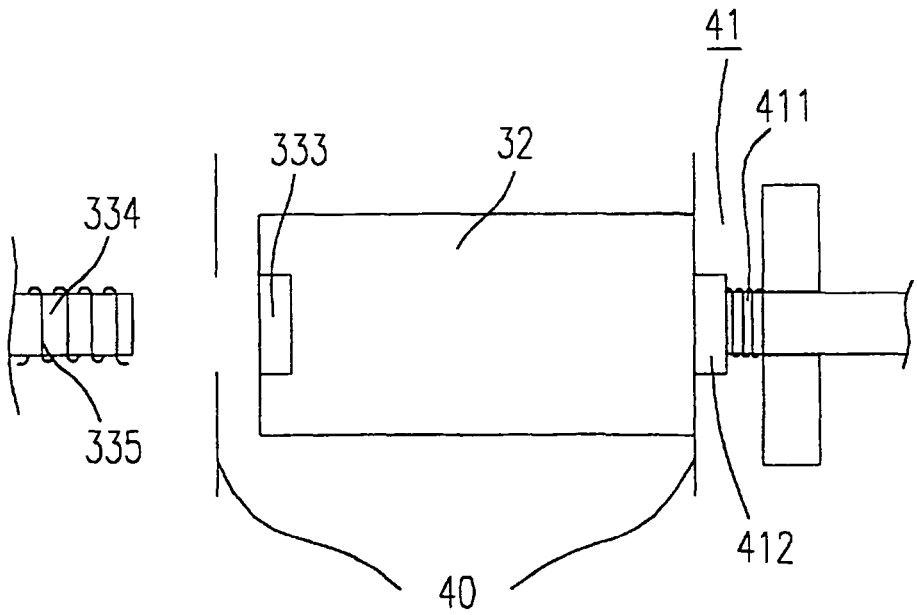

Please refer to FIG. 4C. The driving means 332 includes a permanent magnet 333, an electromagnet 334, a sustaining device 41 includes a spring element 411. The permanent magnet 333 is mounted in the holder 32 and exposed to the air. The electromagnet 334 is secured on the carriage housing 211 (FIG. 3), and aligned with the permanent magnet 333. The spring element 411 is used to sustain against a bump 412 secured on another side of the holder 32 when the holder 32 is shifted thereto. A coil 335 is mounted around the electromagnet 334, and alternately passes therethrough a current. By conducting or interrupting the current passing around the electromagnet 334, the electromagnet 334 is intermittently polarized. The polarization of the electromagnet introduces a repelling force between the two magnets 333 and 334, which moves the holder 32 toward the sustaining device 41 to compress the spring element 411. When the current is interrupted to retrieve the magnetic force, the holder 42 is pushed back by the restoring force of the spring element 411. Therefore, the holder 32 can reciprocates between the first and the second positions. Likewise, two stoppers 40 are preferably provided. The embodiment shown in FIG. 4C has an advantage of less power consumption over the above two embodiments because power is intermittently supplied to the shifting device.

Figure 4D:
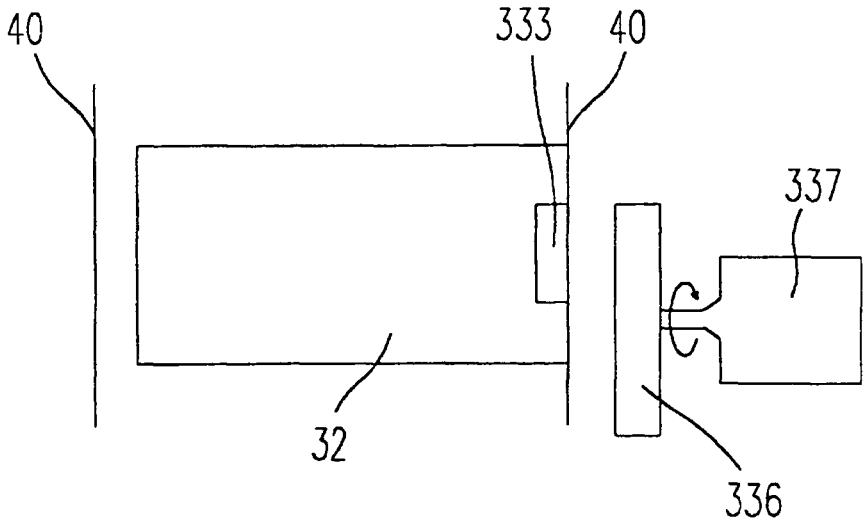

Please refer to FIG. 4D. The driving means 332 includes a first permanent magnet 333, a second permanent magnet 336 and an electric motor 337. The first permanent magnet 333 is mounted in the holder 32 and exposed to the air. The second permanent magnet 336 is partially aligned with the first permanent magnet 333, and coupled to the electric motor 337 which is mounted in the carriage housing 211 (FIG. 3). The second permanent magnet 336 is driven by the electric motor 337 to rotate relative to the first permanent magnet 333. Therefore, the magnetic force between the two magnets 333 and 336 is switched between an attracting and a repelling forces so as to reciprocate the holder 32 between the first and the second positions (FIG. 2). Likewise, two stoppers 40 are preferably provided. The embodiment shown in FIG. 4D has an advantage of even less power consumption over the above three embodiments because no coil current is needed for generating a magnetic force.

As known from the above description, for a double scanning mode, the image data are obtained by scanning twice for each scan line in the X-direction, and moving along the Y-direction to scan line by line. In other words, the photosensing device 32 has to be moved along the X-directional guiding tracks 331 (FIG. 3), and also moved with the carriage 21 along the Y-directional guiding shafts 201 (FIG. 1). There are several feasible ways to program the scanning path. It should be understood that the embodiments are given only for illustration, and do not intend to limit the present invention.

Figure 5A:
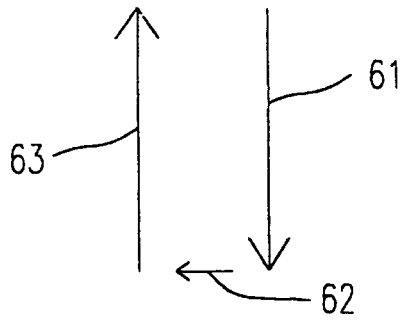
FIGS. 5A~5C illustratively show three feasible ways to perform the double scanning mode of FIG. 4, respectively.

Please refer to FIG. 5A. First, the carriage is moved throughout the document along the Y-direction, as indicated by the arrow 61, wherein the photoelectric sensing device is kept at the first position and performs a scanning operation line by line. Then, the holder as well as the photoelectric sensing device is moved to the second position along the X-direction, as indicated by the arrow 62. Subsequently, the photoelectric sensing device performs another scanning operation line by line while moving back, as indicated by the arrow 63. The scanning data are then synthesized to obtain the image data by proper hardware or software.

Figure 5B:
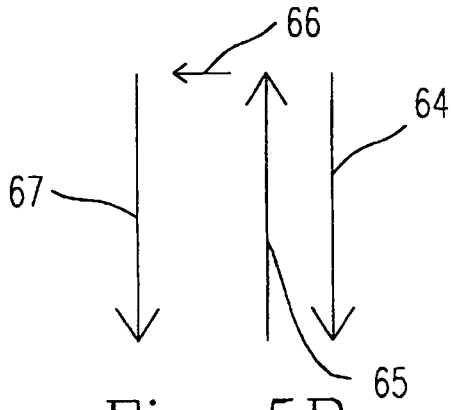

Please refer to FIG. 5B. First, the carriage is moved throughout the document along the Y-direction, as indicated by the arrow 64, wherein the photoelectric sensing device is kept at the first position and performs a scanning operation line by line. Then, the carriage is moved back to the start position, as indicated by the arrow 65, and the photoelectric sensing device is still kept at the first position. Next, the holder as well as the photoelectric sensing device is moved to the second position along the X-direction, as indicated by the arrow 66. Subsequently, the photoelectric sensing device performs another scanning operation line by line while moving along the Y-direction again, as indicated by the arrow 67. The scanning data are then synthesized to obtain the image data by proper hardware or software.

Figure 5C:
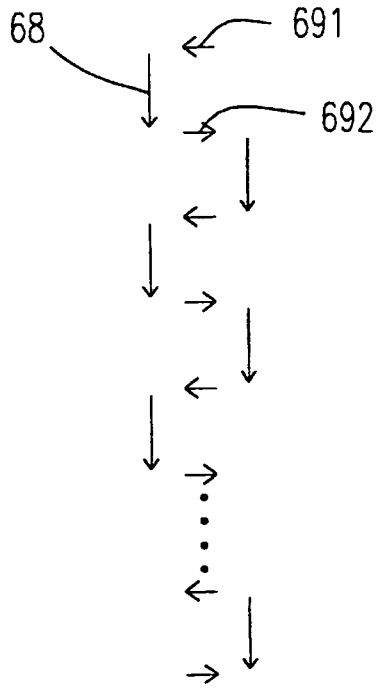

Please refer to FIG. 5C. First, the photoelectric sensing device performs a scanning operation at the first position for a first scan line. Then, the photoelectric sensing device is moved to the second position along the X-direction, as indicated by the arrow 691, to perform another scanning operation for the same scan line. Next, the carriage is moved to a second scan line, as indicated by the arrow 68, and the photoelectric sensing device performs a scanning operation for the second scan line at the second position. The holder is then moved along the X-direction to the first position, as indicated by the arrow 692, and the photoelectric sensing device performs another scanning operation for the same scan line at the first position. Accordingly, each of the scan line is scanned twice, and the entire document is scanned. The scanning data are then synthesized to obtain the image data by proper hardware or software.

Figure 6:
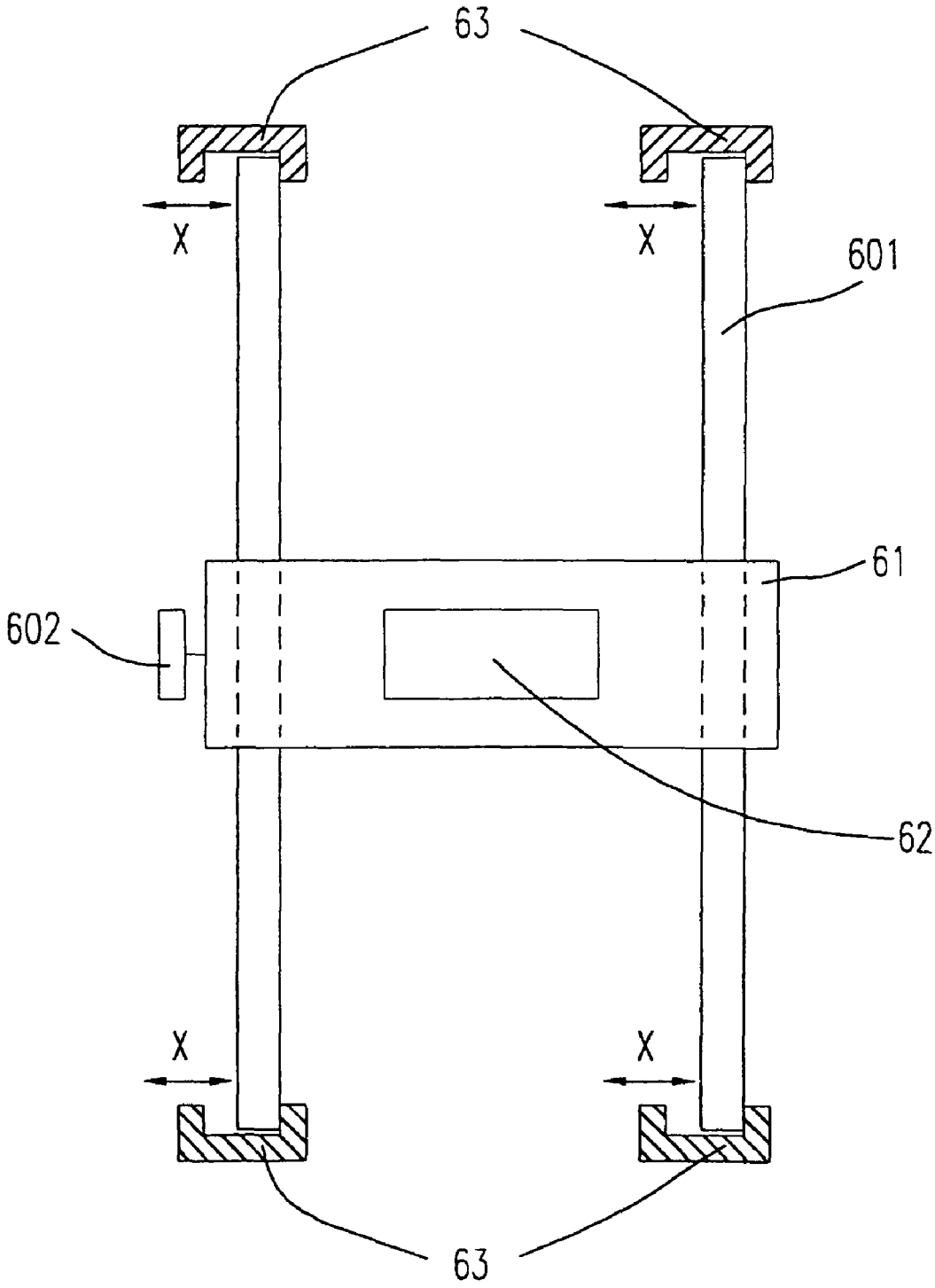
FIG. 6 is a schematic diagram partially showing another preferred embodiment of an image scanner according to the present invention.
Figure 7:
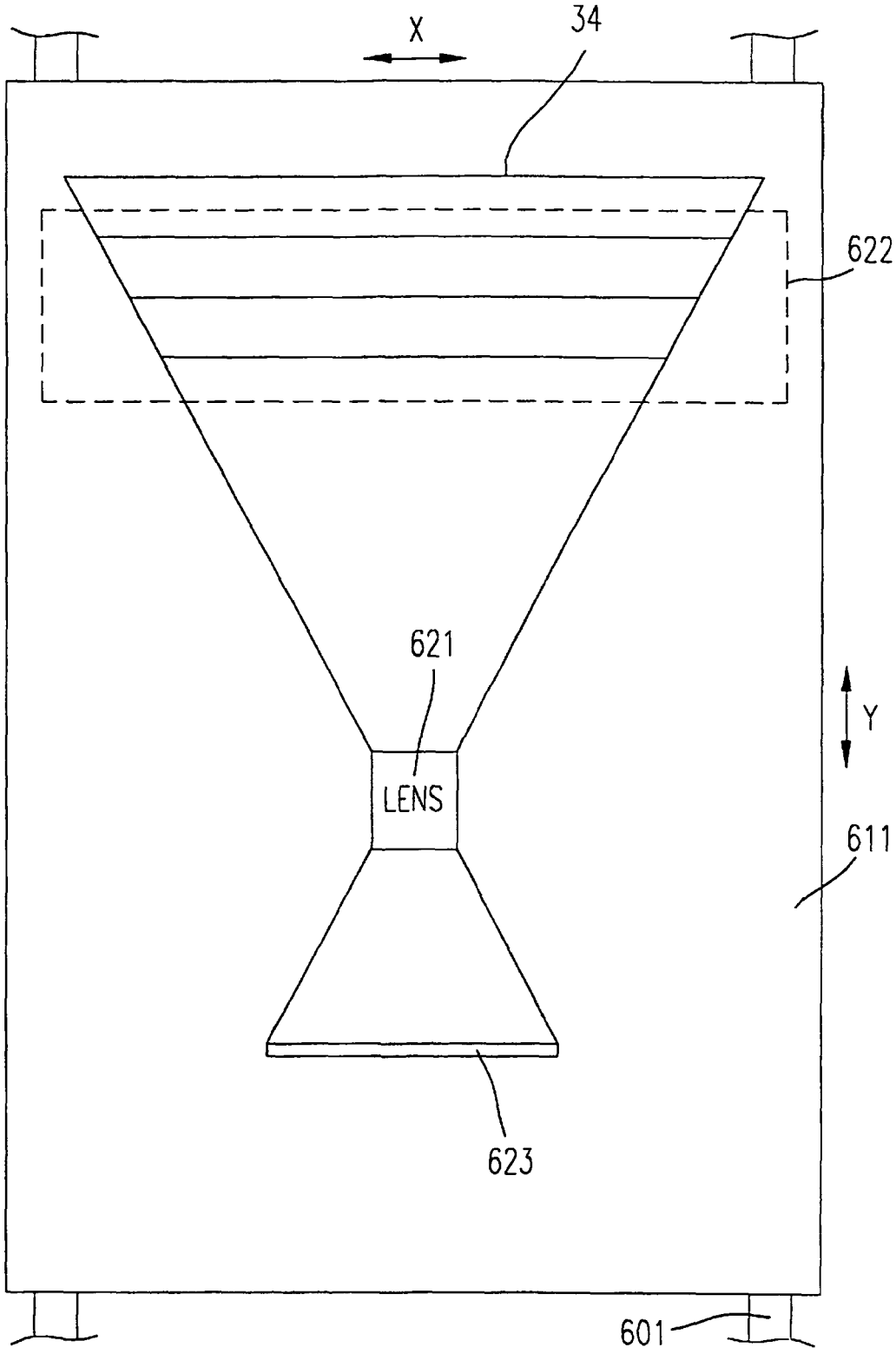
FIG. 7 schematically shows the elements included in the carriage of FIG. 6.

Alternatively, the movement of the photoelectric sensing device along the X-direction can also be achieved by moving the entire carriage. This embodiment will be described as follows with reference to FIGS. 6 and 7. The image scanner includes a carriage 61 for accommodating therein an optical device 62 for picking up the image of a scanned object (not shown). The optical device 62 includes a lens device 621 for focusing and contracting an optical signal, a mirror set 622 arranged upstream of the lens device 621 for transmitting an optical signal from the object to the lens device, and a linear CCD 623 consisting of a plurality of sensing pixels to sense the focused and contracted optical signal to generate an electric signal. All the above elements are secured on a carriage housing 611. The carriage 61 is moved by a shifting device 63 in an X-direction, and moved by a stepping motor 602 along a pair of guiding shafts 601 in a Y-direction. For each scan line, the optical device 62 is moved with the carriage 61 along the X-direction and actuated multiple times to perform scanning operations. With the movement of the carriage 61 along the Y-direction, the entire object is scanned line by line. In order to move the carriage in sections along the X-direction, the shifting device 63 may be any suitable device able to drive the carriage step by step in a pixel or sub-pixel level. For a double scanning mode, any of the magnetic elements as shown in FIGS. 4A~4D can be used or modified to function as the shifting device.

From the above description, it is apparent that the moving distance of the lens and the CCD according to the present invention is much shorter than that according to the Taiwanese Patent Publication No. 313286. Therefore, the unsatisfactory precision, complicated structure and power-consumption problems encountered by the conventional technique can be overcome by the present invention. Furthermore, compared to the software interpolation method, the present invention is more veritable.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanner for reading and converting an image of an object into digital image data, *the image scanner* comprising:

a photoelectric sensing device including a plurality of sensing pixels arranged at equal spaces for converting an optical signal from [said] *the* object into an electric signal;

a shifting device connected to [said] *the* photoelectric sensing device for driving [said] *the* photoelectric sensing device from a first position to a second position along an X-direction to obtain a first electric signal and a second electric signal, respectively, wherein a distance between [said] *the* first and [said] *the* second positions is less than a distance between two adjacent sensing pixels, and [said] *the* first and [said] *the* second electric signals are alternately arranged and converted to form [said] *the* digital image data;

a mirror set arranged upstream of [said] *the* lens device for transmitting [said] *the* optical signal from [said] *the* object to [said] *the* lens device; and a carriage housing [mounting therein said] *carrying the* mirror set, [said] *the* photoelectric sensing device and [said] *the* shifting device, and [moved] *wherein the carriage housing is configured to move* along a Y-direction to scan [said] *the* object.

2. The image scanner according to claim 1 wherein [said] *the* photoelectric sensing device includes:

a lens device for focusing and contracting [said] *the* optical signal;

a linear charge coupled device [consisting of said] *comprising the* plurality of sensing pixels [which senses said] *that sense the* focused and contracted optical signal to generate [said] *the* electric signal; and a holder for mounting thereon [said] *the* lens device and [said] *the* linear charge coupled device, [said] *the* holder being driven by [said] *the* shifting device to allow [said] *the* lens device and [said] *the* linear charge coupled device to be moved together from [said] *the* first position to [said] *the* second position.

3. The image scanner according to claim 1 wherein [said] *the* shifting device includes:

a guiding track secured on [said] *the* carriage housing for guiding [said] *the* holder along [said] *the* X-direction;

a first magnetic element secured on [said] *the* holder; and a second magnetic element secured on [said] *the* carriage housing[,] and cooperating with [said] *the* first magnetic element to generate a magnetic force which reciprocates [said] *the* holder between [said] *the* first and [said] *the* second positions along [said] *the* guiding track.

4. The image scanner according to claim 3 wherein [said] *the* shifting device further includes two stoppers located [by] *on* two opposite sides of [said] *the* holder [in order] to [further assure that said] *assist the* holder [reciprocates] *in reciprocating* between [said] *the* first and [said] *the* second positions.

5. The image scanner according to claim 3 wherein [said] *the* magnetic force includes alternate attracting and repelling forces between [said] *the* first and [said] *the* second magnetic elements.

6. The image scanner according to claim 5 wherein [said] *the* first magnetic element is a first permanent magnet, and [said] *the* second magnetic element includes:

an electric motor; and a second permanent magnet coupled to and driven by [said] *the* electric motor to rotate relative to [said] *the* first permanent magnet to switch [said] *the* magnetic force between [said] *the* attracting and repelling forces so as to reciprocate [said] *the* holder.

7. The image scanner according to claim 5 wherein [said] *the* first magnetic element is a permanent magnet, [said] *the* second magnetic element is an electromagnet aligned with [said] *the* permanent magnet, and [said] *the* magnetic force is switched between [said] *the* attracting and repelling forces by changing a current direction passing around [said] *the* electromagnet so as to reciprocate [said] *the* holder.

8. The image scanner according to claim 5 wherein [said] *the* first magnetic element includes two permanent magnets mounted on two opposite sides of [said] *the* holder, respectively, [said] *the* second magnetic element includes two electromagnets located by [said] *the* two opposite sides of [said] *the* holder and aligned with [said] *the* two permanent magnets, respectively, and [said] *the* magnetic force is switched between [said] *the* attracting and repelling forces by changing current directions passing around [said] *the* electromagnets so as to reciprocate [said] *the* holder.

9. The image scanner according to claim 5 wherein [said] *the* first magnetic element is a permanent magnet, [said] *the* second magnetic element is an electromagnet aligned with [said] *the* permanent magnet, and [said] *the* magnetic force is switched between [said] *the* attracting and repelling forces by controlling whether a current passes around [said] *the* electromagnet so as to reciprocate [said] *the* holder.

10. The image scanner according to claim 1 wherein [said] *the* distance between [said] *the* first and [said] *the* second positions is equal to [a] half of [said] *the* distance between two adjacent sensing pixels.

11. An image scanner for reading and converting an image of an object into digital image data, *the image scanner* comprising:

a photoelectric sensing device including a plurality of sensing pixels arranged at equal spaces for converting an optical signal from [said] *the* object into an electric signal;

a carriage housing for [mounting therein said] *carrying the* photoelectric sensing device; and a shifting device connected to [said] *the* carriage housing for driving [said] *the* carriage housing to move [said] *the* photoelectric sensing device from a first position to a second position along an X-direction;

wherein [said] *the* shifting device further includes two stoppers located by two opposite sides of [said] *the* photoelectric sensing device in order to further assure that [said] *the* photoelectric sensing device reciprocates between [said] *the* first and [said] *the* second positions; and wherein [said] *the* photoelectric sensing device is actuated at [said] *the* first and [said] *the* second positions to obtain a first electric signal and a second electric signal, respectively, a distance between [said] *the* first and [said] *the* second positions is less than a distance between two adjacent sensing pixels, and [said] *the* first and [said] *the* second electric signals are alternately arranged and converted to form [said] *the* digital image data.

12. The image scanner according to claim 11 wherein [said] *the* photoelectric sensing device includes:

a lens device for focusing and contracting [said] *the* optical signal;

a mirror set arranged upstream of [said] *the* lens device for transmitting [said] *the* optical signal from [said] *the* object to [said] *the* lens device; and a linear charge coupled device [consisting of said] *comprising the* plurality of sensing pixels [which senses said] *that sense the* focused and contracted optical signal to generate [said] *the* electric signal.

13. The image scanner according to claim 11 wherein [said] *the* carriage housing is further [moved] *configured to move* along a Y-direction to scan [said] *the* object.

14. The image scanner according to claim 11 wherein [said] *the* distance between [said] *the* first and [said] *the* second positions is equal to [a] half of [said] *the* distance between two adjacent sensing pixels.

*15. A method of obtaining image data from an image scanner, comprising:*

*transmitting an optical signal from a scanned object to a lens device with a mirror set wherein the mirror set is coupled to a carriage housing;*

*transmitting the optical signal from the lens device to a photoelectric sensing device coupled to the carriage housing;*

*obtaining a first signal from the photoelectric sensing device, the photoelectric sensing device comprising a plurality of sensing pixels arranged with approximately equal spacing with respect to each other;*

*moving the photoelectric sensing device from a first position to a second position, wherein the distance between the first position and the second position is less than the distance between two adjacent sensing pixels; and*

*obtaining a second signal from the photoelectric sensing device.*

*16. The method of claim 15, further comprising:*

*generating a magnetic force in a magnetic element disposed on the carriage housing to cooperate with a magnet coupled to the photoelectric sensing device to move the photoelectric sensing device from the first position to the second position along a guiding track disposed on the carriage housing.*

*17. The method of claim 16, wherein the magnetic force includes alternate attracting and repelling forces.*

*18. The method of claim 15, wherein the distance between the first and the second positions is equal to half of the distance between two adjacent sensing pixels.*

*19. The method of claim 15, wherein the shifting device further includes two stoppers located by two opposite sides of the photoelectric sensing device to enable the photoelectric sensing device to move between the first and the second positions.*

*20. An image scanner, comprising:*

*a photoelectric sensing device having a plurality of sensing pixels configured to convert an optical signal into an image signal, wherein at least a portion of the plurality of sensing pixels are arranged with approximately equal spacing;*

*a carriage housing for mounting the photoelectric sensing device;*

*a shifting device coupled to the carriage housing and configured to move the photoelectric sensing device between a first position and a second position along an X-direction;*

*wherein the shifting device further includes two stoppers located on two opposite sides of the photoelectric sensing device to assist the photoelectric sensing device in moving between the first and the second positions; and*

*wherein the photoelectric sensing device is adapted to be moved between the first and the second positions to obtain a first image signal and a second image signal, respectively, wherein a distance between the first and the second positions is less than a distance between two adjacent sensing pixels.*

*21. The image scanner of claim 20, further comprising:*

*a lens device coupled to the carriage housing; and*

*a mirror set coupled to the carriage housing.*

*22. The image scanner of claim 20, wherein the carriage housing is configured to move along a Y-direction to scan an object.*

*23. The image scanner of claim 20, wherein the distance between the first and the second positions is equal to a half of the distance between two adjacent sensing pixels.*

*24. The image scanner of claim 20, further comprising:*

*a guiding track disposed on the carriage housing for guiding the photoelectric sensing device along the X-direction;*

*a first magnetic element coupled to the photoelectric sensing device; and*

*a second magnetic element coupled to the carriage housing and cooperating with the first magnetic element to generate a magnetic force which moves the holder between the first and the second positions along the guiding track.*

*25. The image scanner of claim 24, wherein the magnetic force includes alternate attracting and repelling forces between the first and the second magnetic elements.*

*26. The image scanner of claim 24, wherein one of the first and second magnetic elements comprises a permanent magnet.*

* * * * *

UNITED STATES PATENT AND TRADEMARK OFFICE

CERTIFICATE OF CORRECTION

PATENT NO. : RE43,087 E
APPLICATION NO. : 11/384187
DATED : January 10, 2012
INVENTOR(S) : Tsai et al.

It is certified that error appears in the above-identified patent and that said Letters Patent is hereby corrected as shown below:

Column 10, line 31, in Claim 22, delete "*obiect.*" and insert -- *object.* --.

Signed and Sealed this
Third Day of July, 2012

David J. Kappos

David J. Kappos
*Director of the United States Patent and Trademark Office*